UNITED STATES PATENT OFFICE.

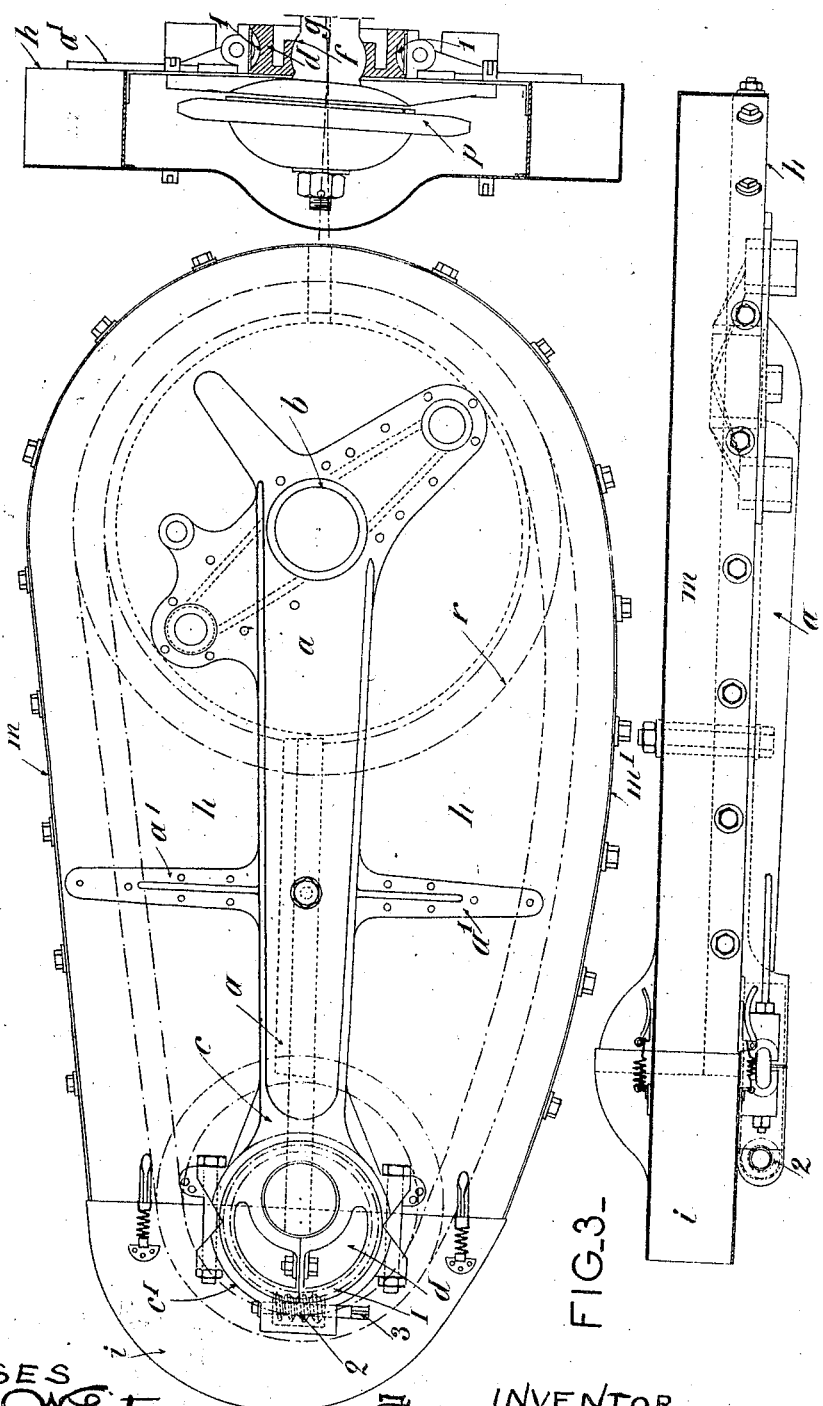

FERDINAND CHARRON, OF PUTEAUX, FRANCE.

CHAIN-DRIVING-GEAR CASE FOR AUTOMOBILES.

No. 855,878.  Specification of Letters Patent.  Patented June 4, 1907.

Application filed March 6, 1907. Serial No. 360,937.

*To all whom it may concern:*

Be it known that I, FERDINAND CHARRON, a citizen of France, residing at 7 Rue Ampère, Puteaux, Seine, France, have invented new and useful Improvements in Chain-Driving-Gear Cases for Automobiles, of which the following is a specification.

This invention relates to improvements in chain driving gear for automobile road vehicles comprising in combination with a gear case a chain-tensioning rod and a ball joint the socket of which is formed in an eccentric collar arranged in an eye or the like at one end of the tensioning rod, simple and convenient means being provided for rotating the eccentric for the purpose of tensioning the chain.

In the annexed drawing, Figure 1 is an elevation of the case in position, seen from the side adjacent the frame. Fig. 2 is a section through the axle of the chain pinion, in which the tensioner, and consequently the case, are represented as considerably deflected, so that the action of the ball joint can be seen. Fig. 3 is a plan view of Fig. 1.

Referring to the drawing, it will be seen that the tensioner consists of a rod $a$ mounted at $b$ on the car axle and having at the other end a head consisting of two parts $c$ $c'$ between which is located an eccentric collar $d$, the suitably shaped eye of which embraces the spherical bearing surface $f$ provided on the axle $g$ of the chain pinion.

The internal plate $h$ of the case is rigidly fixed at a suitable number of points to the tensioner $a$ and arms $a'$ thereof, and to this plate are fixed by bolts or fasteners the other parts of the case, which generally comprises two halves $m$ and $m'$, one covering the upper part and the other the lower part of the device, and a removable cap $i$ which incloses one end of the device and is attached to the former parts by fasteners.

The eccentric carries a crown with helicoidal teeth 1 which are continuously in mesh with a small screw 2 lodged in the head of the rod $a$. The desired tension is imparted to the chain by simply actuating the small screw by means of a small hand-key placed on the squared end 3 of the latter. This simple construction has the advantage that the members, that is to say the crown and screw, not being independently reversible, as is well known, no locking means are required.

As can be seen, with the method of applying the chain gear case according to the present invention, the car-axle can be inclined with regard to the axle of the chain pinions without in any way interfering with the displacement of the tensioner and case carried by the car-axle. The tensioner is pivoted on the ball-joint $f$ of the axle of the chain pinion $p$, and the case oscillates about the said chain pinion without touching it.

Having now described my invention, what I claim as new and desire to secure by Letters Patent is:

In a chain driving gear for automobile road vehicles, a gear-case $h$ $i$ $m$ $m'$ in combination with a chain tensioning rod $a$ to which is fixed the gear-case, a bearing provided at one end of the rod and adapted to rotate on the car-axle in a plane perpendicular thereto, a head $c$ $c'$ provided at the other end of the rod, a collar $d$ located in the head $c$ $c'$ and capable of rotating therein, there being an eccentric spherical eye formed in the collar $d$, and a spherical bearing surface $f$ provided on the axle of the chain pinion and adapted to be fitted in the spherical eye of the collar $d$, there being a crown with helicoidal teeth 1 provided on the periphery of the collar $d$, and an endless screw 2 lodged in the head $c$ $c'$ of the rod, meshing with the helicoidal teeth 1 of the crown and provided with a prismatic end 3, substantially as described and for the purpose set forth.

In testimony whereof I have signed my name to this specification in the presence of two subscribing witnesses.

FERDINAND CHARRON.

Witnesses:
ANTOINE LAVOIX,
HERNANDO DE SOTO.